(12) United States Patent
Kamalizad et al.

(10) Patent No.: US 10,555,332 B2
(45) Date of Patent: Feb. 4, 2020

(54) DATA TRANSMISSION BASED ON INTERFERER CLASSIFICATION

(71) Applicant: Cisco Technology, Inc., San Jose, CA (US)

(72) Inventors: Amir Hosein Kamalizad, Menlo Park, CA (US); Matthew Aaron Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 151 days.

(21) Appl. No.: 15/792,624

(22) Filed: Oct. 24, 2017

(65) Prior Publication Data

US 2019/0124672 A1    Apr. 25, 2019

(51) Int. Cl.
| | |
|---|---|
| *H04W 72/12* | (2009.01) |
| *H04L 25/02* | (2006.01) |
| *H04W 72/08* | (2009.01) |
| *H04B 17/336* | (2015.01) |
| *H04L 1/00* | (2006.01) |
| *H04W 28/18* | (2009.01) |

(52) U.S. Cl.
CPC ...... *H04W 72/1231* (2013.01); *H04B 17/336* (2015.01); *H04L 25/0204* (2013.01); *H04W 72/082* (2013.01); *H04L 1/0015* (2013.01); *H04W 28/18* (2013.01)

(58) Field of Classification Search
CPC .......... H04W 72/1231; H04W 72/082; H04W 28/18; H04B 17/336; H04L 25/0204; H04L 1/0015
See application file for complete search history.

(56) References Cited

U.S. PATENT DOCUMENTS

| | | | |
|---|---|---|---|
| 8,553,599 B2 * | 10/2013 | Aoyagi ................ | H04W 36/08 370/310 |
| 9,350,483 B2 | 5/2016 | Zhou et al. | |
| 9,473,179 B2 | 10/2016 | Mukherjee et al. | |
| 9,532,243 B2 | 12/2016 | Kim et al. | |
| 2010/0104158 A1 * | 4/2010 | Shechtman .............. | G06K 9/46 382/131 |
| 2015/0105067 A1 * | 4/2015 | Valliappan ........ | H04W 74/0808 455/424 |
| 2016/0037544 A1 | 2/2016 | Wang | |
| 2016/0095110 A1 | 3/2016 | Li et al. | |

* cited by examiner

*Primary Examiner* — Walter J Divito

(74) *Attorney, Agent, or Firm* — Patterson + Sheridan, LLP

(57) ABSTRACT

A method for transmitting a data transmission based on the classification of an interfering signal is described. The method comprises transmitting a first data transmission within a frequency band and detecting an interfering signal within the frequency band. The method comprises classifying the interfering signal as one of a plurality of interfering signal types. The method comprises transmitting, based on the classification, a second data transmission within the frequency band.

15 Claims, 4 Drawing Sheets

DATA TRANSMISSION BASED ON INTERFERER CLASSIFICATION

TECHNICAL FIELD

The present disclosure relates generally to wireless networks, and in particular, transmitting data over a wireless network in the presence of interfering signals.

BACKGROUND

When performing data transmission by transmitting a data signal over wireless network, noise and interfering signals produced by interferers can degrade performance of the data transmission.

BRIEF DESCRIPTIONS OF THE DRAWINGS

For a better understanding of aspects of the various implementations described herein and to show more clearly how they may be carried into effect, reference is made, by way of example only, to the accompanying drawings.

Figure 1:
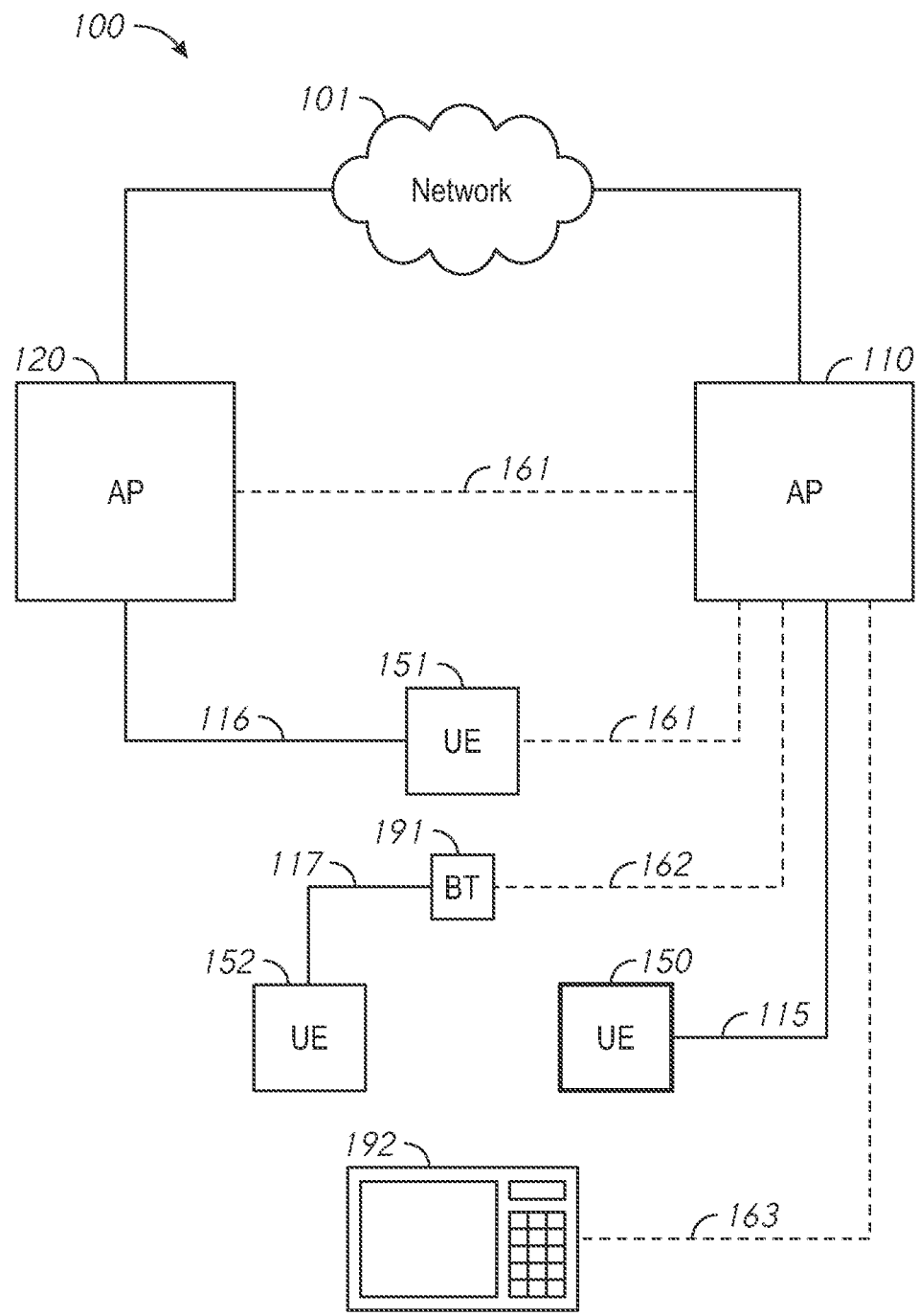
FIG. 1 is a block diagram of a wireless communication environment in accordance with various implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of illustrative implementations shown in the drawings. However, the drawings merely show some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein include apparatuses, systems, and methods for adjusting data transmission based on the classification of an interfering signal. The method includes transmitting a first data transmission within a frequency band and detecting an interfering signal within the frequency band. The method further includes classifying the interfering signal as one of a plurality of interfering signal types. The method further includes transmitting, based on the classification, a second data transmission within the frequency band.

Example Embodiments

Using LTE as an alternative to IEEE 802.11 WiFi in the unlicensed U-NII 5 GHz band has the potential to increase the number of interferers in a WiFi network. The interferers produce interfering signals that can degrade the performance of data transmissions over the WiFi network.

In various implementations, LTE transmissions are performed according to LTE-U/LAA in which carrier aggregation of a licensed LTE carrier (referred to as an "anchor") and various transmissions in the unlicensed 5 GHz frequency band is used to improve data rates and quality-of-service (QoS) of the LTE transmissions. In various implementations, LTE transmission are performed according to MulteFire in which the LTE protocol is used as a replacement for WiFi in the unlicensed 5 GHz frequency band. Thus, in various implementations, LTE signals are transmitted in the unlicensed 5 GHz frequency band potentially impacting the performance of WiFi networks operating in the same frequency band.

FIG. 1 is a functional block diagram of a wireless communications environment 100 in accordance with some implementations. The wireless communications environment 100 includes a user equipment 150 (such as a cell phone, tablet, laptop, etc.) connected to a network 101 via a wireless access point 110. In various implementations, the network 101 includes any public or private LAN (local area network) and/or WAN (wide area network), such as an intranet, an extranet, a virtual private network, and/or portions of the Internet.

The user equipment 150 transmits data to and receives data from the network 101 via data transmissions 115 to and from the wireless access point 110. In various implementations, the wireless access point 110 is an IEEE 802.11 WiFi access point. Accordingly, in various implementations, the data transmissions 115 to and from the wireless access point 110 are performed according to the IEEE 802.11 standard. Thus, in various implementations, the data transmissions 115 to and from the wireless access point 110 are, at least partially, in the unlicensed 5 GHz frequency band.

The wireless communications environment 100 further includes a second user equipment 151 connected to the network 101 via a second wireless access point 120. The second user equipment 151 transmits data to and receives data from the network 101 via data transmissions 116 to and from the second wireless access point 120. In various implementations, the second wireless access point 120 is an LTE access point (which may be referred to as a "base station", an "eNodeB", or a "gNodeB"). Accordingly, in various implementations, the data transmissions 116 to and from the second wireless access point 120 are performed according to the LTE standard, including the LTU-E standard, LAA standard, LWA standard, or MulteFire standard. Thus, in various implementations, the data transmissions 116 to and from the second wireless access point 120 are, at least partially, in the unlicensed 5 GHZ frequency band.

Because, in various implementations, both the data transmissions 115 to and from the wireless access point 110 and the data transmissions 116 to and from the second wireless access point 120 are, at least partially, in the same frequency band, the data transmissions 116 to and from the second wireless access point 120 can be received as interfering signals 161 by the user equipment 150 and the wireless access point 110.

The wireless communications environment 100 further includes a third user equipment 152 in communication with an associated device 191 (such as a Bluetooth earpiece). In various implementations, data transmissions 117 between the third user equipment 152 and the Bluetooth device 191 can be received as interfering signals 162 by the user equipment 150 and the wireless access point 110. The wireless communications environment 100 further includes an interference generator 192 (e.g., a microwave) that produces non-data signals that can be received by the user equipment 150 and the wireless access point 110 as interfering signals 163.

The interfering signals 161-163 have the potential to degrade performance of the data transmissions 115 between the user equipment 150 and the wireless access point 110. For example, in various implementations, the interfering signals 161-163 increase the bit error rate, increase the packet drop rate, or decrease the data rate. Accordingly, in various implementations, the wireless access point 110 includes a controller that adjusts parameters of the data transmissions 115 based on detection of the interfering signals 161-163. In particular, as described in detail below, the wireless access point 110 adjusts parameters of the data transmissions 115 based on a classification of the interfering signals 161-163 such that different types of interfering signals 161-163 affect the data transmissions 115 in different ways.

Figure 2:
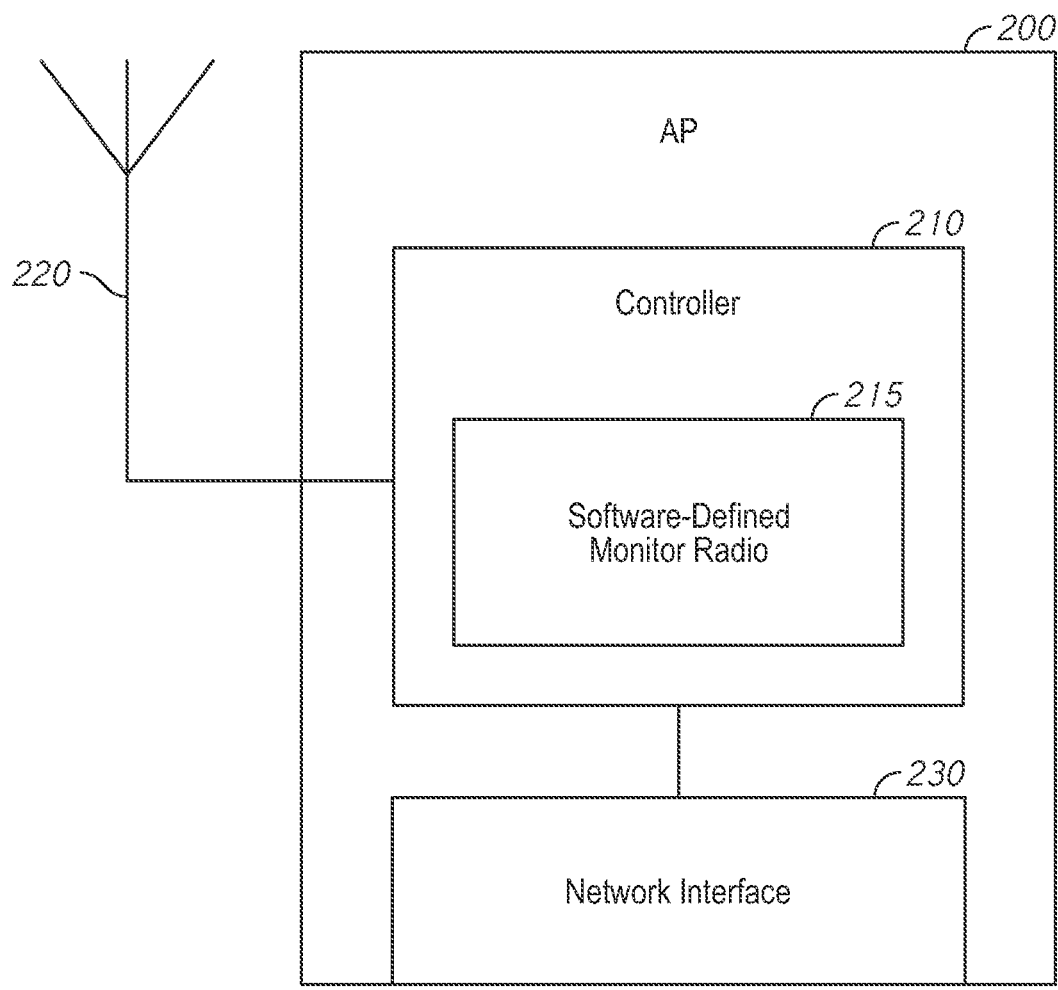
FIG. 2 is a block diagram of a wireless access point in accordance with various implementations.

FIG. 2 is a functional block diagram of a wireless access point 200 in accordance with some implementations. The wireless access point includes a controller 210 coupled to an antenna 220 and a network interface 230. The controller 200 can wirelessly transmit and receive data signals via the antenna 220 (e.g., to or from one or more user equipments such as the user equipment 150 of FIG. 1) and wiredly transmit and receive data signals via the network interface 230 (e.g., to or from a network such as the network 101 in FIG. 1).

The controller 210 includes a software-defined monitor radio 215 to detect and classify interfering signals. In particular, in various implementations, the software-defined monitor radio 215 is configured to detect LTE signals in unlicensed bands (e.g., in the 5 GHz frequency band). In various implementations, the software-defined monitor radio 215 is collocated with a service radio. In various implementations, the software-defined monitor radio 215 is separate from the service radio, thereby enabling previously installed wireless access points (e.g., WiFi access points) to coexist smarter with LTE.

In various implementations, the software-defined monitor radio 215 is shared between multiple wireless access points. Thus, detection and classification of interfering signals is performed by a single wireless access point 200 having a software-defined monitor radio 215 and the results of the detection and classification are shared to other wireless access points in the area (e.g., via a network, such as the network 101 of FIG. 1).

Figure 3:
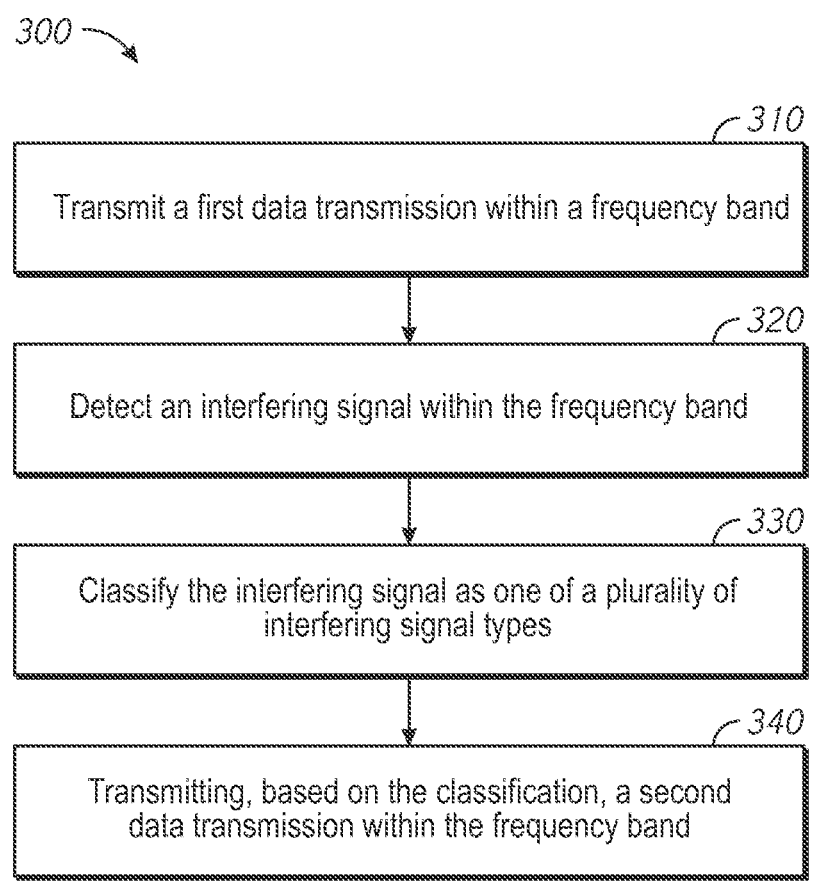
FIG. 3 is a flowchart representation of a method of transmitting a data transmission based on the classification of an interferer in accordance with various implementations.

FIG. 3 is a flowchart representation of a method 300 of adjusting data transmission based on interferer classification in accordance with some implementations. In some implementations (and as detailed below as an example), the method 300 is performed by a wireless access point, such as the wireless access point 150 of FIG. 1, or a portion thereof, such as the controller 210 of FIG. 2. In some implementations, the method 300 is performed by processing logic, including hardware, firmware, software, or a combination thereof. In some implementations, the method 300 is performed by a processor executing code stored in a non-transitory computer-readable medium (e.g., a memory). Briefly, the method 300 includes classifying a detected interfering signal as one of a plurality of interfering signal types and transmitting a data transmission based on the classification.

The method 300 begins, in block 310, with the wireless access point transmitting a first data transmission within a frequency band. In various implementations, the first data transmission is transmitted according to the IEEE 802.11 WiFi standard. In various implementations, the frequency band includes the unlicensed 5 GHz frequency band.

The method 300 continues, at block 320, with the wireless access point detecting an interfering signal within the frequency band. In various implementations, the interfering signal is detected using a software-defined monitor radio (SMR) of the wireless access point. In various implementations, the interfering signal is detected by measuring a received signal strength indicator (RSSI) of the first data transmission.

The method 300 continues, at block 330, with the wireless access point classifying the interfering signal as one of a plurality of interfering signal types. In various implementations, the plurality of interfering signal types can include a signal type associated with data signals using the same protocol as the first transmission (e.g., WiFi). In various implementations, the plurality of interfering signal types can include one or more signal types associated with data signals using a different protocol than the first transmission (e.g., LTE, Bluetooth, or WiMax). In various implementations, the plurality of interfering signal types can include one or more signal types associated with non-data signals (e.g., a jammer or a noise source, such as a microwave).

In various implementations, classifying the interfering signal includes classifying the interfering signal as an LTE signal. In some embodiments, an LTE signal includes resource blocks surrounding DC which act as training symbols and repeat frequently. Accordingly, in various implementations, classifying the interfering signal as an LTE signal includes performing an autocorrelation on at least a portion of the interfering signal (e.g., a preamble, training symbols, or resource blocks surrounding DC) and detecting symmetry in the interfering signal by detecting an autocorrelation result greater than a threshold. In various implementations, classifying the interfering signal as an LTE signal includes performing a cross-correlation on at least a portion of the interfering signal (e.g., a preamble, training symbols, or resource blocks surrounding DC) with a known sequence (e.g., a known portion of the preamble or known training symbols) and detecting a cross-correlation result greater than a threshold. In some embodiments, an LTE signal transmits at a duty cycle of less than 100 percent. For example, when an LTE controller detects WiFi signals in the same coverage area, the LTE controller controls data transmissions to occur at a duty cycle of less than 100 percent (e.g., 50% or less, 75% or less, 90% or less, or 95% or less). In various implementations, the duty cycle is based on the detected WiFi signals (e.g., their signal strength or their multitude). Accordingly, in various implementations, classifying the interfering signal as an LTE signal include determining a duty cycle of the interfering signal and detecting that the duty cycle is less than 100 percent.

In various implementations, classifying the interfering signal as an LTE signal is performed in other ways, such as by decoding a preamble of the LTE signal or receiving data via a network (e.g., the network 101 of FIG. 1) indicating that an LTE wireless access point is nearby.

Although, in various implementations as described below, the classification is used to adjust a second data transmission, the detection and classification of an LTE signal can be used in other ways. For example, in various implementations, the detection of an LTE signal is reported to a central controller via a network (e.g., the network 101 of FIG. 1). This may help troubleshooting and performance analysis in certain area or alert a system administrator to the unexpected presence of an LTE device (e.g., an LTE wireless access point) in the area.

The method 300 continues, at block 340, with the wireless access point transmitting, based on the classification, a second data transmission within the frequency band. The wireless access point can adjust data transmission (as between the first data transmission and the second data transmission) in a number of ways based on the classification.

In various implementations, transmitting, based on the classification, the second data transmission includes transmitting the second data transmission with a transmission time based on the classification. It is to be appreciated that the term "transmission time" can include multiple time spans (e.g., periodically during off duty cycle times of the interferer). In various implementations, the wireless access point determines, based on the classification, that the interfering signal has off duty cycle times. For example, in various implementations, the wireless access point classifies the interfering signal as an LTE signal which has off duty cycle times. Accordingly, in various implementations, the wireless access point transmits the second data transmission with a transmission time that coincides with the off duty cycle times. Thus, the wireless access point transmits the second data transmission when the interfering signal is not present.

In various implementations, transmitting, based on the classification, the second data transmission includes transmitting the second data transmission with a data rate based on the classification. In various implementations, the wireless access point transmits the second data transmission with a first data rate if the interfering signal is a first signal type and transmits the second data transmission with a second data rate if the interfering signal is a second signal type. For example, in accordance with a classification of the interfering signal as a signal type not associated with duty cycle (such as a noise source or a jammer), the wireless access point reduces the data rate of the second data transmission as compared to the data rate of the first data transmission. However, in accordance with a classification of the interfering signal as a signal type associated with a duty cycle (such as an LTE signal), the wireless access point maintains the data rate of the second data transmission at the data rate of the first data transmission. Various rate adaptation algorithms tend to reduce the data rate if the wireless access point starts to see a lot of dropped packets at a negotiated rate (e.g., the data rate of the first data transmission). However, knowing that LTE has a duty cycle, the wireless access point can stay at the higher data rate even if it starts dropping packets, because once the LTE goes to off duty cycle, a high throughout can be achieved.

In various implementations, both the transmission time and the data rate are based on the classification. For example, in various implementations, the wireless access point, in response to detecting a signal type associated with a duty cycle (e.g., an LTE signal), transmits at a high data rate during the off duty cycle times and with a low data rate during the on duty cycle times.

In various implementations, transmitting, based on the classification, the second data transmission includes transmitting the second data transmission with a transmission frequency based on the classification. It is to be appreciated that the term "transmission frequency" can include multiple frequency bands or channels. In various implementations, the wireless access point transmits the second data transmission with a first transmission frequency if the interfering signal is a first signal type and transmits the second data transmission with a second transmission frequency if the interfering signal is a second signal type.

For example, in accordance with a classification of the interfering signal as a signal type detectable at a first detection threshold (e.g., an energy detect threshold of approximately −62 dBm), the wireless access point transmits the second data transmission with a transmission frequency substantially equal to a transmission frequency of the first data transmission. Thus, the transmission frequency is not changed. However, in accordance with a classification of the interfering signal as a signal type detectable at a second detection threshold (e.g., a preamble detection threshold of approximately −82 dBm), the wireless access point transmits the second data transmission with a transmission frequency that avoids the interfering signal. Thus, in response to detecting a microwave oven at −70 dBm (e.g., less than the energy detect threshold), the wireless access point does not change the transmission frequency, but in response to detecting an LTE signal at −70 dBM, the wireless access point changes the transmission frequency to avoid the LTE signal (e.g., transmits in frequency bands at which the LTE signal is not present). Thus, the wireless access point allocates channels in such a way to have the least amount of co-channel interference from an LTE signal.

However, in various implementations, backing off of channels in which an LTE signal is detected may place WiFi transmissions at a disadvantage for getting access to a channel. Accordingly, in various implementations, in accordance with a classification of the interfering signal as a signal type detectable at a first detection threshold (e.g., an energy detect threshold of approximately −62 dBm), the wireless access point transmits the second data transmission with a transmission frequency different from a transmission frequency of the first data transmission (e.g., avoids the interferer). However, in accordance with a classification of the interfering signal as a signal type detectable at a second detection threshold (e.g., a preamble detection threshold of approximately −82 dBm), the wireless access point transmits the second data transmission at substantially the same transmission frequency as the first data transmission (e.g., staying on channels on which an LTE signal is detected to cause the LTE signal to back off).

Figure 4:
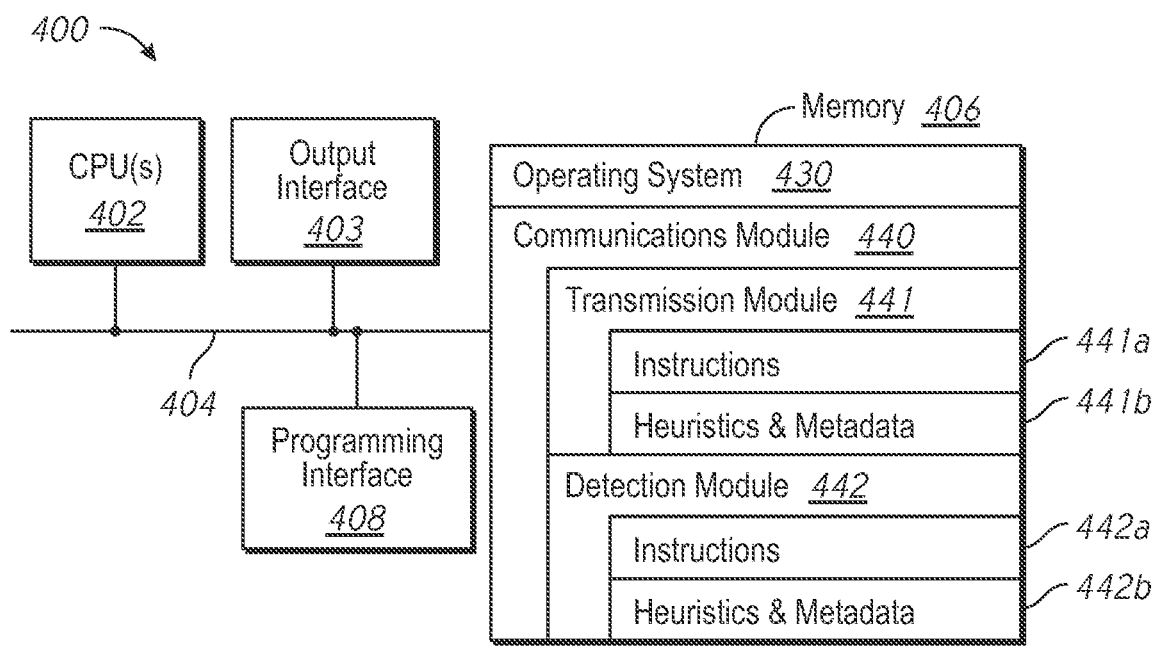
FIG. 4 is a block diagram of an example of a device in accordance with some implementations.

FIG. 4 is a block diagram of a computing device 400 in accordance with some implementations. In some implementations, the computing device 400 corresponds to the wireless access point 110 of FIG. 1 and/or the wireless access point 200 of FIG. 2 and performs one or more of the functionalities described above with respect to those systems. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 400 includes one or more processing units (CPU's) 402 (e.g., processors), one or more output interfaces 403 (e.g., a network interface), a memory 406, a programming interface 408, and one or more communication buses 404 for interconnecting these and various other components.

In some implementations, the communication buses 404 include circuitry that interconnects and controls communications between system components. The memory 406 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 406 optionally includes one or more storage devices remotely located from the CPU(s) 402. The memory 406 comprises a non-transitory computer readable storage medium. Moreover, in some implementations, the memory 406 or the non-transitory computer readable storage medium of the memory 406 stores the following programs, modules and data structures, or a subset thereof including an optional operating system 430 and a communications module 440. In some implementations, one or more instructions are included in a combination of logic and non-transitory memory. The operating system 430 includes procedures for handling various basic system services and for performing hardware dependent tasks. In some implementations, the communications module 440 is configured to connect user equipment to a network. To that end, the communications module 440 includes a transmission module 441 and a detection module 442.

In some implementations, the transmission module 441 is configured to transmit a first data transmission within a frequency band. To that end, the transmission module 441 includes a set of instructions 441a and heuristics and metadata 441b. In some implementations, the detection module 442 is configured to detect an interfering signal within the frequency band. To that end, the detection module 442 includes a set of instructions 442a and heuristics and metadata 442b. In some implementations, the detection module 442 is further configured to classify the interfering signal as one of a plurality of interfering signal types. In some implementations, the transmission module 441 is further configured to transmit, based on the classification, a second data transmission within the frequency band.

Although the communications module 440, the transmission module 441, and the detection module 442 are illustrated as residing on a single computing device 400, it should be understood that in other embodiments, any combination of the communications module 440, the transmission module 441, and the detection module 442 can reside in separate computing devices in various implementations. For example, in some implementations, each of the communications module 440, the transmission module 441, and the detection module 442 reside on a separate computing device.

Moreover, FIG. 4 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
   transmitting a first data transmission at a first data rate within a frequency band;
     detecting an interfering signal within the frequency band;
     classifying the interfering signal as one of a plurality of interfering signal types;
   transmitting, a second data transmission within the frequency band with a second data rate less than the first data rate based on classifying the interfering signal as a first interfering signal type associated with no duty cycle; and transmitting a third data transmission within the frequency band with a third data rate substantially equal to the first data rate based on classifying the interfering signal as a second signal type associated with a duty cycle.

2. The method of claim 1, wherein classifying the interfering signal comprises classifying the interfering signal as an LTE (Long Term Evolution) signal.

3. The method of claim 2, wherein classifying the interfering signal as an LTE signal comprises:

performing a correlation on at least a portion of the interfering signal; and detecting a correlation result greater than a threshold.

4. The method of claim 1, wherein the frequency band includes a 5 GHz (Gigahertz) frequency band.

5. The method of claim 1, wherein the third data transmission is transmitted with a transmission time based on the duty cycle.

6. The method of claim 5, further comprising:

in response to determining, that the interfering signal has off duty cycle times, transmitting the third data transmission beginning with the transmission time to coincide with the off duty cycle times.

7. The method of claim 1 the second data transmission is transmitted with a transmission frequency based on classifying the interfering signal.

8. The method of claim 7, further comprising:

wherein the second data transmission is transmitted with a second transmission frequency equal to a first transmission frequency of the first data transmission based on the first interfering signal type being detectable at a first detection threshold.

9. A system comprising:

an antenna; and a controller configured to:

transmit, via the antenna, a first data transmission at a first data rate within a frequency band;

detect an interfering signal within the frequency band;

classify the interfering signal as one of a plurality of interfering signal types; and transmit, via the antenna and based on the interfering signal type that the interfering signal is classified as, a second data transmission within the frequency band at a second data rate, wherein the second data rate is less than the first data rate when the interfering signal is classified as a first interfering signal type associated with no duty cycle, and the second data rate is equal to the first data rate when the interfering signal is classified as a second interfering signal type associated with a duty cycle.

10. The system of claim 9, wherein classifying the interfering signal comprises classifying the interfering signal as an LTE (Long Term Evolution) signal.

11. The system of claim 10, wherein the controller classifies the interfering signal as an LTE signal by:

performing an autocorrelation on at least a portion of the interfering signal; and detecting symmetry in the interfering signal using the autocorrelation.

12. The system of claim 9, wherein the second data transmission is transmitted at a transmission time based on the duty cycle.

13. The system of claim 9, wherein the second data transmission is transmitted with a transmission frequency based on which interfering signal type the interfering signal is classified as the.

14. A non-transitory computer-readable medium having instructions encoded thereon which, when executed by a processor, causes the processor to perform operations comprising:

transmitting a first data transmission at a first data rate within a frequency band;

detecting an interfering signal within the frequency band;

classifying the interfering signal as one of a plurality of interfering signal types; and transmitting, based on the classification, a second data transmission within the frequency band at a second data rate, wherein the second data rate is equal to the first data rate in response to classifying the interfering signal as a first interfering signal type associated with a duty cycle; and transmitting, based on the classification, a third data transmission within the frequency band at a third data rate, wherein the third data rate is less than the first data rate in response to classifying the interfering signal as a second interfering signal type associated with no duty cycle.

15. The non-transitory computer-readable medium of claim 14, wherein classifying the interfering signal comprises classifying the interfering signal as an LTE (Long Term Evolution) signal.

\* \* \* \* \*

UNITED STATES PATENT AND TRADEMARK OFFICE
CERTIFICATE OF CORRECTION

PATENT NO. : 10,555,332 B2
APPLICATION NO. : 15/792624
DATED : February 4, 2020
INVENTOR(S) : Amir Hosein Kamalizad et al.

It is certified that error appears in the above-identified patent and that said Letters Patent is hereby corrected as shown below:

In the Claims

In Column 8, Line 66, in Claim 1, delete "transmitting," and insert -- transmitting --.

In Column 9, Line 27, in Claim 7, after "claim 1" insert -- , --.

Signed and Sealed this
Twentieth Day of December, 2022

Katherine Kelly Vidal
*Director of the United States Patent and Trademark Office*